United States Patent
Ge

(10) Patent No.: US 10,822,503 B2
(45) Date of Patent: Nov. 3, 2020

(54) PROCESSING TECHNOLOGY OF BUSBAR FOR NEW ENERGY AUTOMOBILE

(71) Applicant: SHANGHAI VEKAN PRECISION INDUSTRY CO., LTD, Shanghai (CN)

(72) Inventor: Yangbo Ge, Shanghai (CN)

(73) Assignee: SHANGHAI VEKAN PRECISION INDUSTRY CO., LTD, Shanghai (CN)

(*) Notice: Subject to any disclaimer, the term of this patent is extended or adjusted under 35 U.S.C. 154(b) by 126 days.

(21) Appl. No.: 16/119,897

(22) Filed: Aug. 31, 2018

(65) Prior Publication Data

US 2020/0071545 A1   Mar. 5, 2020

(51) Int. Cl.

| | | |
|---|---|---|
| *C09D 5/18* | (2006.01) | |
| *C09D 131/04* | (2006.01) | |
| *C09D 7/48* | (2018.01) | |
| *C09D 7/63* | (2018.01) | |
| *C09D 7/61* | (2018.01) | |
| *H01B 13/06* | (2006.01) | |
| *H01B 1/02* | (2006.01) | |
| *H01B 13/00* | (2006.01) | |
| *B60R 16/02* | (2006.01) | |
| *H01M 2/20* | (2006.01) | |
| *H01B 3/44* | (2006.01) | |
| *H01B 3/14* | (2006.01) | |
| *H01B 3/12* | (2006.01) | |
| *H01B 3/10* | (2006.01) | |
| *H01B 3/46* | (2006.01) | |

(52) U.S. Cl.
CPC ............... *C09D 5/18* (2013.01); *B60R 16/02* (2013.01); *C09D 7/48* (2018.01); *C09D 7/61* (2018.01); *C09D 7/63* (2018.01); *C09D 131/04* (2013.01); *H01B 1/023* (2013.01); *H01B 13/0036* (2013.01); *H01B 13/06* (2013.01); *H01M 2/206* (2013.01); *H01B 3/10* (2013.01); *H01B 3/12* (2013.01); *H01B 3/14* (2013.01); *H01B 3/446* (2013.01); *H01B 3/447* (2013.01); *H01B 3/46* (2013.01); *H01B 3/465* (2013.01)

(58) Field of Classification Search
None
See application file for complete search history.

(56) References Cited

U.S. PATENT DOCUMENTS

| | | | | |
|---|---|---|---|---|
| 4,317,277 A | * | 3/1982 | Bennett | B23K 11/163 174/94 R |
| 4,443,652 A | * | 4/1984 | Izu | H01L 31/076 136/244 |
| 2016/0315305 A1 | * | 10/2016 | Wintner | H01M 2/206 |
| 2017/0031226 A1 | * | 2/2017 | Gauthier | C23C 14/5873 |
| 2017/0256770 A1 | * | 9/2017 | Wynn | H01M 2/1077 |

* cited by examiner

*Primary Examiner* — Nathan T Leong
(74) *Attorney, Agent, or Firm* — Anova Law Group, PLLC

(57) ABSTRACT

A processing technology of a busbar for a new energy automobile comprises the following steps: first step: punching a raw material blank of a busbar to obtain a busbar base material; second step: spraying high-temperature-resistant insulating paint on part or whole of an outer surface of the busbar base material obtained in the first step; and third step: drying to obtain a busbar. The busbar of the present invention has simple processing technology.

6 Claims, No Drawings

PROCESSING TECHNOLOGY OF BUSBAR FOR NEW ENERGY AUTOMOBILE

TECHNICAL FIELD

The present invention relates to the field of new energy automobiles and, more particularly, relates to a process for forming a busbar for a new energy automobile.

BACKGROUND

A busbar is an important material used in new energy automobiles. The material of the existing busbar cannot achieve the requirement of the new energy automobiles.

Therefore, it is necessary to provide a process for forming a busbar for new energy automobiles.

SUMMARY

The purpose of the present invention is to provide a process for forming a busbar for a new energy automobile.

To achieve the above purpose, the technical solution adopted in the present invention is as follows: a process for forming a busbar for a new energy automobile comprises the following steps:

first step: punching a raw material blank of a busbar to obtain a busbar base material;

second step: spraying high-temperature-resistant insulating paint on part or whole of an outer surface of the busbar base material obtained in the first step; and third step: drying to obtain a busbar;

a raw material formula of the high-temperature-resistant insulating paint comprises the following materials in mass percent:

| | |
|---|---|
| high aluminum cement | 5~15%; |
| attapulgite clay | 5~7%; |
| porcelain clay | 5~7%; |
| titanium dioxide | 2~5%; |
| graphene nano flakes | 2~6%; |
| boron phosphate | 2~6%; |
| n-methylol acrylamide | 2~5%; |
| aluminum dihydrogen phosphate | 3~9%; |
| polydimethylsiloxane | 3~7%; |
| methylphenyl silicone resin | 3~7%; |
| vinyl silicone oil | 3~7%; |
| polyvinyl acetate emulsion | 10~23%; |
| deionized water | balance. |

A preferred technical solution is as follows: the thickness of the busbar base material is less than or equal to 12.5 mm; the cross-sectional area of the busbar base material is less than or equal to 38 cm$^3$; the tensile strength, σb of the busbar base material is greater than or equal to 200 Mpa; the yield strength, σp0.2 of the busbar base material is greater than or equal to 150 Mpa; and the elongation, δ5 of the busbar base material is greater than or equal to 15%.

A preferred technical solution is as follows: the density of the busbar base material is 2.7 g/cm$^3$.

A preferred technical solution is as follows: the thermal conductivity of the busbar base material at 25° C. is 218 W/(m·K).

A preferred technical solution is as follows: the conductivity of the busbar is greater than or equal to 57% IACS.

A preferred technical solution is as follows: the solid content in the raw material formula of the high-temperature-resistant insulating paint is less than or equal to 60%.

Since the above-mentioned technical solution is used, the present invention has the following advantages and effects compared with the prior art:

1. The busbar of the present invention can reduce the cost, reduce automobile weight and increase energy utilization rate.

2. The tensile strength and the yield strength of the busbar of the present invention satisfy bending tensile performance of punching, and the strength of automobile structural components, and meanwhile, the busbar also has higher conductivity and satisfies power connection and transmission.

3. The busbar of the present invention has good high temperature resistant performance and insulating performance.

4. The busbar of the present invention has simple processing technology.

DETAILED DESCRIPTION

The present invention is further described below in combination with embodiments:

Embodiment 1: A Process for Forming a Busbar for a New Energy Automobile

The process for forming the busbar for the new energy automobile comprises the following steps:

first step: punching a raw material blank of a busbar to obtain a busbar base material;

second step: spraying high-temperature-resistant insulating paint on part or whole of an outer surface of the busbar base material obtained in the first step; and third step: drying to obtain a busbar.

The thickness of the busbar base material is 12.5 mm; the cross-sectional area of the busbar base material is 38 cm$^3$; the tensile strength, σb of the busbar base material is 200 Mpa; the yield strength, σp0.2 of the busbar base material is greater than or equal to 150 Mpa; and the elongation, δ5 of the busbar base material is 15%. The density of the busbar base material is 2.7 g/cm$^3$. The thermal conductivity of the busbar base material at 25° C. is 218 W/(m·K). The conductivity of the busbar base material is 57% IACS.

The busbar base material is made of aluminum. The aluminum contains 0.3%-0.4% mass fraction of Si, 0.6%-0.7% mass fraction of Fe, a total of less than or equal to 1 of other impurities, and the balance of aluminum.

A raw material formula of the high-temperature-resistant insulating paint comprises the following materials in mass percent:

| | |
|---|---|
| high aluminum cement | 14%; |
| attapulgite clay | 7%; |
| porcelain clay | 5%; |
| titanium dioxide | 3%; |
| graphene nano flakes | 3%; |
| boron phosphate | 6%; |
| n-methylol acrylamide | 5%; |
| aluminum dihydrogen phosphate | 4%; |
| polydimethylsiloxane | 5%; |
| methylphenyl silicone resin | 7%; |
| vinyl silicone oil | 3%; |
| polyvinyl acetate emulsion | 12%; |
| deionized water | 26%. |

The organosilicon leveling agent comprises silicone oil, polydimethylsiloxane, polyether and polyester modified organic siloxane, alkyl modified organic siloxane and terminal group modified organic silicon. In the present embodiment, specifically, the silicone oil is selected.

Embodiment 2: A Process for Forming a Busbar for a New Energy Automobile

The process for forming the busbar for the new energy automobile comprises the following steps:
first step: punching a raw material blank of a busbar to obtain a busbar base material;
second step: spraying high-temperature-resistant insulating paint on part or whole of an outer surface of the busbar base material obtained in the first step; and
third step: drying to obtain a busbar.

The thickness of the busbar base material is 12.5 mm; the cross-sectional area of the busbar base material is 38 cm$^3$; the tensile strength, σb of the busbar base material is 200 Mpa; the yield strength, σp0.2 of the busbar base material is greater than or equal to 150 Mpa; and the elongation, δ5 of the busbar base material is 15%. The density of the busbar base material is 2.7 g/cm$^3$. The thermal conductivity of the busbar base material at 25° C. is 218 W/(m·K). The conductivity of the busbar base material is 57% IACS.

The busbar base material is made of aluminum. The aluminum contains 0.3%-0.4% mass fraction of Si, 0.6%-0.7% mass fraction of Fe, a total of less than or equal to 1 of other impurities, and the balance of aluminum.

A raw material formula of the high-temperature-resistant insulating paint comprises the following materials in mass percent:

| | |
|---|---|
| high aluminum cement | 6%; |
| attapulgite clay | 5%; |
| porcelain clay | 6%; |
| titanium dioxide | 5%; |
| graphene nano flakes | 5%; |
| boron phosphate | 4%; |
| n-methylol acrylamide | 3%; |
| aluminum dihydrogen phosphate | 8%; |
| polydimethylsiloxane | 4%; |
| methylphenyl silicone resin | 6%; |
| vinyl silicone oil | 3%; |
| polyvinyl acetate emulsion | 21%; |
| deionized water | 24%. |

The organosilicon leveling agent is a mixture of the polydimethylsiloxane and the polyether and polyester modified organic siloxane in the mass ratio of 1:1.

The above-mentioned embodiments only aim to explain the technical conception and feature of the present invention, and aim to make those skilled in the art know the content of the present invention and implement same accordingly, which cannot limit the protection scope of the present invention. Any equivalent change or modification made according to the spirit substance of the present invention shall be covered within the protection scope of the present invention.

The invention claimed is:

1. A process for forming a busbar for a new energy automobile, comprising:
   first step: punching a raw material blank of the busbar to obtain a busbar base material;
   second step: spraying high-temperature-resistant insulating paint on part or whole of an outer surface of the busbar base material obtained in the first step; and
   third step: drying to obtain the busbar, wherein:
   a raw material formula of the high-temperature-resistant insulating paint comprises following materials in mass percent:

| | |
|---|---|
| high aluminum cement | 5~15%; |
| attapulgite clay | 5~7%; |
| porcelain clay | 5~7%; |
| titanium dioxide | 2~5%; |
| graphene nano flakes | 2~6%; |
| boron phosphate | 2~6%; |
| n-methylol acrylamide | 2~5%; |
| aluminum dihydrogen phosphate | 3~9%; |
| polydimethylsiloxane | 3~7%; |
| methylphenyl silicone resin | 3~7%; |
| vinyl silicone oil | 3~7%; |
| polyvinyl acetate emulsion | 10~23%; and |
| deionized water | balance. |

2. The process according to claim 1, characterized in that: a thickness of the busbar base material is less than or equal to 12.5 mm; a cross-sectional area of the busbar base material is less than or equal to 38 cm$^3$; a tensile strength, σb of the busbar base material is greater than or equal to 200 Mpa; a yield strength, σp0.2 of the busbar base material is greater than or equal to 150 Mpa; and an elongation, δ5 of the busbar base material is greater than or equal to 15%.

3. The process according to claim 2, characterized in that: a density of the busbar base material is 2.7 g/cm$^3$.

4. The process according to claim 2, characterized in that: a thermal conductivity of the busbar base material at 25° C. is 218 W/(m·K).

5. The process according to claim 2, characterized in that: a conductivity of the busbar is greater than or equal to 57% IACS.

6. The process according to claim 1, characterized in that: solid content in the raw material formula of the high-temperature-resistant insulating paint is less than or equal to 60%.

* * * * *